US006078668A

United States Patent [19]

Poulsen

[11] Patent Number: 6,078,668

[45] Date of Patent: *Jun. 20, 2000

[54] APPARATUS AND METHOD FOR CONCEALING DATA BURSTS IN AN ANALOG SCRAMBLER USING AUDIO REPETITION

[75] Inventor: Steven P. Poulsen, Lincoln, Nebr.

[73] Assignee: Transcrypt International, Inc., Lincoln, Nebr.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/689,397

[22] Filed: Aug. 7, 1996

[51] Int. Cl.[7] .......... H04L 9/00

[52] U.S. Cl. .......... 380/274; 380/236; 380/252; 380/275; 380/276; 380/38; 380/59

[58] Field of Search .......... 380/9, 19, 20, 380/48, 6, 8, 10, 49, 50, 59, 200, 205, 210, 236–238, 252–255, 33, 34, 274, 275, 276, 38; 370/522, 527, 528, 529; 455/35.1, 38.1, 403, 466; 371/38.1, 39.1, 44, 45

[56] References Cited

U.S. PATENT DOCUMENTS

| | | | |
|---|---|---|---|
| 3,824,467 | 7/1974 | French | 325/32 |
| 4,169,245 | 9/1979 | Crom et al. | 325/58 |
| 4,188,616 | 2/1980 | Kazami et al. | 371/39.1 |
| 4,392,021 | 7/1983 | Slate | 179/1.5 R |
| 4,434,323 | 2/1984 | Levine et al. | 178/22.17 |
| 4,811,394 | 3/1989 | Ragavan et al. | 380/21 |
| 4,937,867 | 6/1990 | Kasparian et al. | 380/35 |
| 5,029,340 | 7/1991 | Hashimoto | 380/15 |
| 5,319,707 | 6/1994 | Wasilewski et al. | 380/14 |
| 5,351,300 | 9/1994 | Quisquater et al. | 380/46 |
| 5,379,345 | 1/1995 | Greenberg | 380/23 |
| 5,768,374 | 6/1998 | Poulsen | 380/9 |
| 5,802,076 | 9/1998 | Weigand et al. | 371/31 |

FOREIGN PATENT DOCUMENTS

| | | |
|---|---|---|
| 57-113647 | 7/1982 | Japan . |

OTHER PUBLICATIONS

IBM Technical Disclosure Bulletin, vol. 23 No. 1 Jun. 1980 Digital Speech Scrambler—P.A. Franaszek.

*Primary Examiner*—Bernarr E. Gregory
*Attorney, Agent, or Firm*—Zarley, McKee, Thomte, Voorhees & Sease

[57] ABSTRACT

An apparatus and method for concealing data bursts in an analog scrambler using audio repetition. What otherwise would be periodic data bursts appearing at the audio output are replaced with samples from audio portions of the multiplexed signal. Preferably the replaced audio samples come from immediately past portions of the audio of the signal. The data bursts are therefore effectively concealed from the audio output which improves on the degradation of audio otherwise caused by the data bursts that are mixed in periodically with the audio portions of the signal.

19 Claims, 2 Drawing Sheets

APPARATUS AND METHOD FOR CONCEALING DATA BURSTS IN AN ANALOG SCRAMBLER USING AUDIO REPETITION

BACKGROUND OF THE INVENTION

A. Field of the Invention

The present invention relates to audio communication transmissions, and in particular, to such transmissions wherein data bursts are contained within the transmissions, and more particularly, to an apparatus and method to improve on the audio quality of such transmissions.

B. Problems in the Art

In certain situations data is required to be sent with audio transmissions. A primary example is in voice communication, and in particular in radio communication of voice or audio.

An example of such data is synchronization information, in for example, scrambled or encrypted audio transmissions. The synchronization data allows a receiver to synchronize to a scrambling method incorporated in the transmission.

In time-division multiplexing (TDM), data is sent in small packets or bursts periodically entrained in an analog waveform containing audio. The time length of each data burst is optimally kept to a minimum, but even though short in duration (generally milliseconds), the data bursts essentially represent interruptions in a continuous audio signal. This tends to degrade the quality of the audio.

Therefore, there is a real and present need in the art to improve on the degradation caused by such data bursts. It is therefore the principal object of the present invention to solve or improve over the problems or deficiencies in the art.

Furthermore it is the object of the present invention to provide an apparatus and method for concealing data bursts in an analog scrambler:

A. which conceals the data bursts by repeating audio taken from the audio portion of the transmission;

B. which conceals the data bursts in a manner which reduces degradation of the audio;

C. which essentially substitutes audio from the audio portion of the signal in a manner that is improved over either muting audio output during receipt of data bursts, or allowing the data bursts to go to audio output;

D. which is adjustable for various sizes and types of data bursts;

F. which is implementable in several fashions, including with a digital signal processor; and G. which is economical, efficient and durable in use.

These and other objects, features, and advantages of the present invention will become more apparent with reference to the accompanying specification and claims.

SUMMARY OF THE INVENTION

The invention includes a method of concealing data bursts in a transmitted time multiplexed signal, comprising periods of scrambled audio and periods of data bursts, by replacing at an audio output the data bursts with audio taken from the audio portions of the transmitted time multiplexed signal. In one aspect of the invention, the replacement of the data bursts is accomplished by storing immediate past audio samples from the signal and playing back those audio samples during receipt of a data burst. The replay of sampled audio is correlated to the length of a data burst.

The apparatus according to the present invention utilizes a storage buffer that contains audio samples of the audio portion of the signal, a switching device, and a control device to allow the audio portions of the signal to pass through the switching device to an audio output, but changing state to pass stored audio samples to the audio output at those times when a data burst otherwise would be present at the audio output. The data bursts in the signal are therefore effectively concealed.

DETAILED DESCRIPTION OF THE PREFERRED EMBODIMENT

Figure 1:
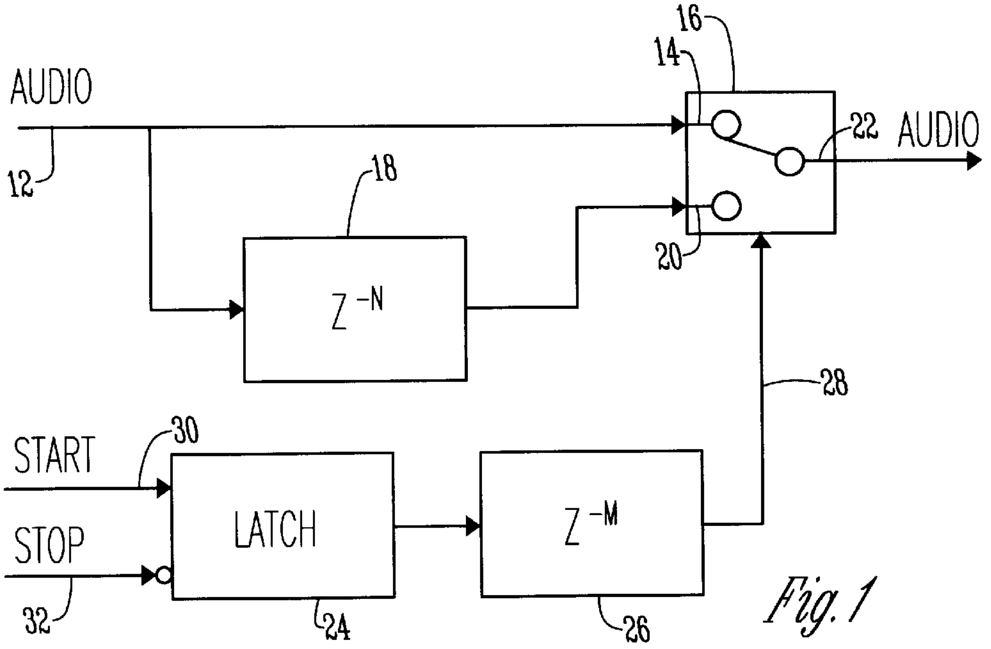
FIG. 1 is a schematic representation of an embodiment according to the present invention.

To better understand the invention, one embodiment thereof will now be described in detail. Frequent reference will be taken to the drawings. Reference numerals are used to indicate certain parts and locations in the drawings. The same reference numerals will be used to indicate the same parts and locations throughout the drawings in this description, unless otherwise indicated.

FIG. 1 illustrates schematically an apparatus according to the present invention. In this embodiment, an audio input 12 receives a signal of the type diagrammatically depicted at reference numeral 50 in FIG. 3. In this embodiment, signal 50 is a time-division multiplexed (TDM) signal consisting of audio portions (see reference numerals 62 in FIG. 3) with periodically interspersed data bursts (reference numerals 64 in FIG. 3). Portions 62 are time varying analog waves representative of audio or speech. Portions 64 represent an analog carrier wave with modulated digital information contained therein.

As can be seen in FIG. 1, TDM signal 50 enters audio input 12 and passes both to a first input 14 of a switch device 16 and to what will be called storage buffer 18. The output of storage buffer 18 appears at second input 20 to switch 16. The output 22 of switch 16 is connected to an audio processing circuit which converts the analog audio waveform in a manner that can then be output to a speaker.

FIG. 1 also shows that a latch 24 has an output connected to what will be called time-delay device 26, which has an output 28 which is connected to and controls the state of switch 16. Latch 24 is controlled by a start line 30 and a stop line 32. As such, latch 24 and time-delay 26 control whether multiplexed signal 50 is passed to output 22, or whether the output of buffer 18 is passed to output 22.

Operation of the embodiment of FIG. 1 is as follows. Multiplexed signal 50 is essentially an audio signal mixed with periodic data bursts 64 and is presented as an input signal at audio input 12 in FIG. 1. This signal 50 is fed to first input 14 of switch 16 and into storage buffer 18 which is N samples in length. It is to be understood that in the preferred embodiment the N samples correspond to the number of samples required to completely fill a time period which is slightly longer than a data burst 64. In the preferred embodiment N samples corresponds to the number of samples required to completely fill 37.5 microseconds ($\mu$s) which is 1.5 $\mu$s longer than the data to be removed (a data burst).

The present invention operates at a sampling rate of 8 Khz. Therefore the value N can be calculated according to the following equation.

$N=8{,}000\cdot\text{samples}/s\cdot 37.5\cdot\mu s=300$

Thus in one embodiment of the invention, the buffer is 300 samples in length.

As mentioned, the multiplexed signal 50 is also sent to the first input 12 of switch 16, which has a default position as shown in FIG. 1 which routes the input audio directly to output 22 of switch 16. However, when switch 16 is in what will be called the "on" position, where second input 20 is connected to output 22, the audio output (multiplexed signal 50) is taken from second input 20 which is driven by buffer 18. Buffer 18 basically supplies what will be referred to as the "old" block of N samples stored in buffer 18 during what will be called a "replay mode". Switch 16 is activated through start and stop lines 30 and 32. These lines pass through latch 24 which latches the output high when a positive-going pulse is detected on start. When a positive-going pulse is present on receipt of the stop instruction, latch 24 resets its output to the low state.

The output of latch 24 is sent through a delay device 26 of M samples in length. This allows the device controlling start and stop lines 30 and 32 to not be synchronized to the actual audio. It is to be understood that this operation assumes that the audio will arrive at the controlling unit to the start and stop lines 30 and 32 before it is present on the audio input 12 of FIG. 1.

The value of M can be set experimentally or it can be computed by evaluating the system delays, such as can be accomplished by one skilled in the art. An alternate method consists of a separate delay on start and stop lines 30 and 32 as opposed to one delay on the output of latch 24. This allows what can be called the "replay window" to be widened to be larger than the actual data pulse width.

Figure 2:
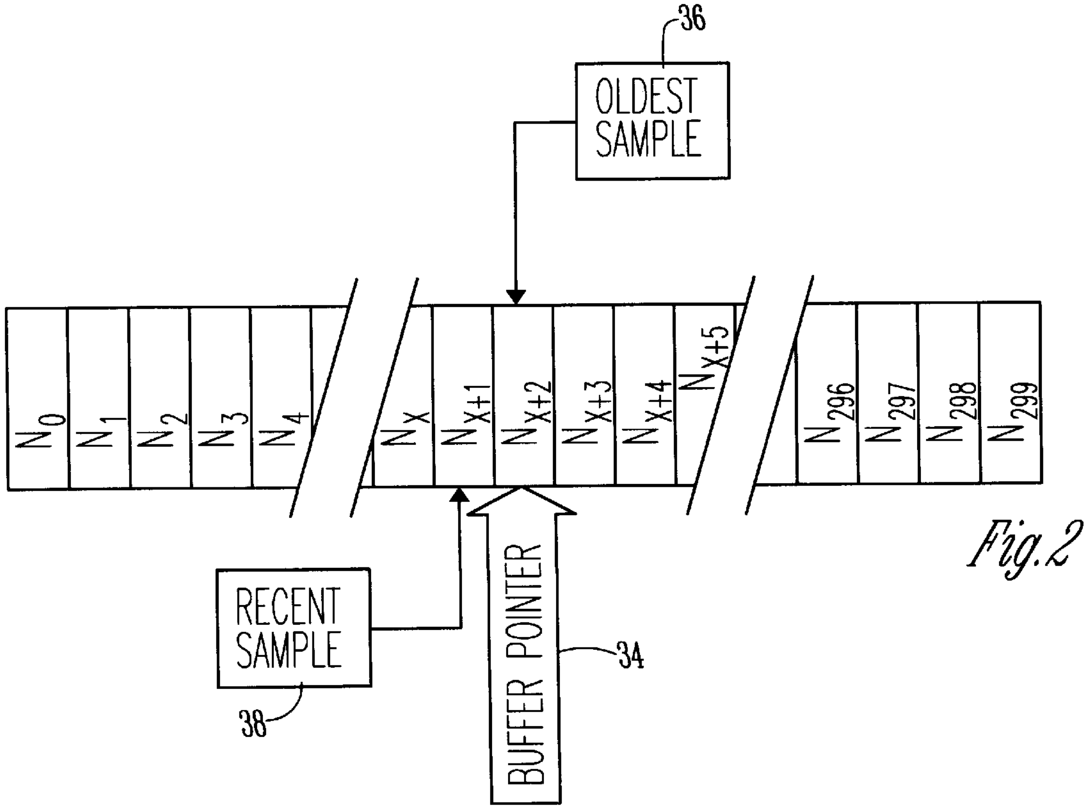
FIG. 2 is a diagrammatic representation of a storage buffer such as could be used with the embodiment of FIG. 1.

To assist in understanding operation of delay buffer 18, reference can be taken to FIG. 2. In the preferred embodiment, buffer 18 is 300 samples long and has an associated pointer 34. Pointer 34 points to the location in the storage buffer that the next audio input sample will be stored. Buffer 18 gets its output from the current location of pointer 34 just before it is overwritten by the next input sample. This output is referred to as the "oldest sample" 36, or the [N-299] sample.

Once the sample is stored, pointer 34 is advanced one sample position. This means that the location just before pointer 34 contains what is called the most "recent sample" 38.

Therefore, by utilizing a sampling procedure of the analog multiplexed signal, buffer 18 continuously refreshes itself with the most recent audio sample and purges itself of the oldest audio sample, in the context of the finite length of N samples in length. As will be discussed further below, the storage process associated with buffer 18 delays the signal to input 20 of switch 16 sufficiently so that when a data burst actually appears at input 14, enough past audio samples are contained in buffer 18 to replace the entire data pulse at output 22.

Figure 3:
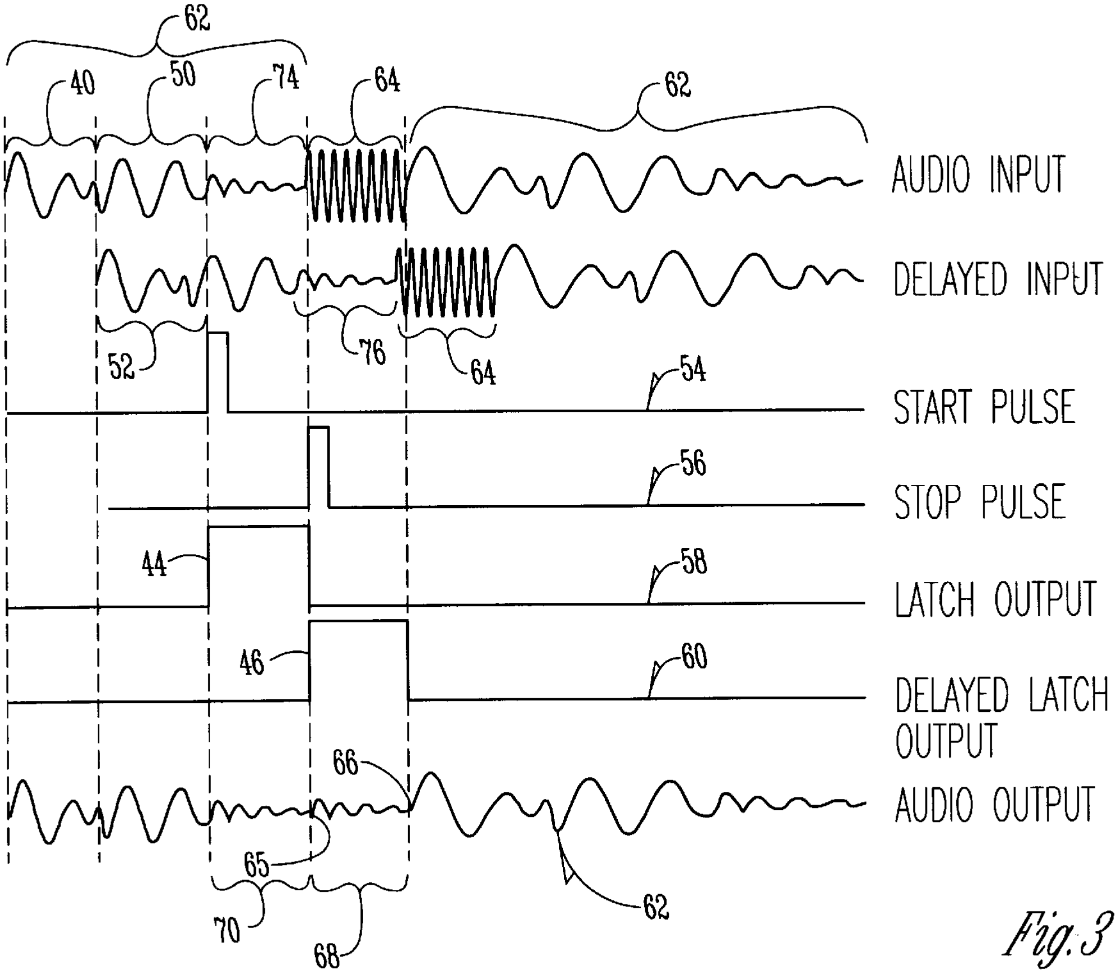
FIG. 3 are diagrammatic representations of signals at various points in the embodiment of FIG. 1.

By referring specifically to FIG. 3, a timing diagram for FIG. 1 is shown. As previously mentioned, what will be called audio input 12 receives the time-divided multiplexed waveform 50 at the top of FIG. 3. The output 52 of buffer 18 is just a delayed version of signal 50. It is delayed for a period of time designated by reference numeral 40. This delay is related to the characteristics of storage buffer 18 in the process of storing samples in buffer 18. By appropriate selection, the delay can be increased or decreased according to need or desire.

It should be noted that start pulse and stop pulse 54 and 56, that appear at start and stop lines 30 and 32 of FIG. 1, are earlier in time than the actual data bursts 64 in signal 50. Latch 24 generates a pulse signal 58 from start and stop pulses 54 and 56 based on the leading edge of those pulses. Pulse-delay device 26 serves to shift pulse 44 in latch output signal 58 so that it lines up with data burst 64 of signal 50. Shifted pulse 46 of delayed latch output signal 60 switches switch 16 such that the audio during pulse 46 comes from the output of storage buffer 18 (in other words, the delayed input signal 52 of FIG. 3). The audio at other times comes directly from audio input signal 50 of FIG. 3. The resultant audio output on output 22 of switch 16 is shown by signal 62 in FIG. 3. Discontinuities 65 and 66 near the edges of the replayed portion 68 of audio output 62 can be smoothed with an optional low-pass filter (not shown). Lengthening of the window defined by pulse 46 of the delayed output latch 60 can be performed, as discussed earlier, so that there is some tolerable error in the location of data pulse 64 relative to delayed latch output pulse 46.

As can be seen in FIG. 3 at audio output 62, replayed audio segment 68 is essentially an identical reproduction of the immediately preceding portion 70. Stated a different way, portion 74 of audio input 50, intentionally selected to be slightly longer in length than data pulse 64, is repeated in portions 70 and 68 in audio output 62 to thereby conceal the data pulse 64 in the audio output.

Therefore, if portion 68 of audio output 62 is of a duration less than a syllable of speech, this replacement of replayed audio 68, instead of the digital data burst 64, will substantially improve upon the audio degradation that occurs by otherwise having periodic data burst 64 in the audio output 62.

The included preferred embodiment is given by way of example only, and not by way of limitation to the invention, which is solely described by the claims herein. Variations obvious to one skilled in the art will be included within the invention defined by the claims.

For example, the operation of the various components diagrammatically depicted in FIG. 1 can be implemented in hardware, firmware, or substantially in software. As previously mentioned, a significant amount of the operation can be implemented in a digital signal processor.

By further example, instead of storing immediate past audio samples, audio samples from another part of the time-divided multiplexed waveform could be replayed during data bursts, even samples from the future or succeeding portion or portions of audio relative to the data burst being replayed.

What is claimed:

1. A method of concealing data bursts during reception of a transmitted time multiplexed signal comprising periods of scrambled audio and periods of said data bursts comprising:

descrambling the scrambled audio;

during the scrambled audio periods, passing descrambled audio to an output;

during periods of said data bursts passing previously stored audio to said output therefore replacing at the output said data bursts with audio.

2. The method of claim 1 wherein the stored audio is taken from the set comprising scrambled audio prior to a data burst, scrambled audio after a data burst, descrambled audio prior to a data burst, and descrambled audio after a data burst.

3. The method of claim 1 wherein the step of replacing at the output said data bursts comprises storing immediately preceding or immediately succeeding audio samples from the multiplexed signal relative to a data burst and replaying the audio samples during said data burst.

4. The method of claim 3 wherein the storage of the audio samples is correlated to the length of a data burst.

5. The method of claim 4 wherein the data bursts are of a length that is generally less than a spoken syllable.

6. The method of claim 3 further comprising constantly replenishing the stored audio samples.

7. The method of claim 1 wherein the stored audio is taken from near the data burst being replaced.

8. A method of concealing data bursts when receiving a transmitted time multiplexed signal comprising periods of scrambled audio and periods of said data bursts comprising:

storing audio samples from the signal;

replacing a data burst with audio samples.

9. The method of claim 8 wherein the step of replacing a data burst comprises storing immediately preceding or immediately succeeding audio samples in the multiplexed signal and replaying the audio samples during the data burst.

10. The method of claim 8 wherein the stored audio samples are scrambled audio taken from the signal, and after replacement of a data burst with stored audio samples, descrambling the scrambled audio and stored audio samples.

11. The method of claim 8 wherein the stored audio samples are descrambled audio taken from the signal after descrambling, and replacement of the stored audio samples takes place after the signal is descrambled.

12. The method of claim 8 wherein the stored audio samples are taken from near the data burst being replaced.

13. The method of claim 8 wherein the stored audio samples are taken from one of an immediately preceding portion and immediately succeeding portion of the audio of the signal relative to the data burst being replaced.

14. An apparatus for concealing data bursts in the output signal of a descrambler of a transmitted time multiplexed signal comprising periods of scrambled audio and periods of said data bursts comprising:

a storage buffer adapted to contain an audio sample of at least as long a length as a data burst;

a switching device;

a first signal pathway to the switching device;

a second signal pathway to the buffer, the output of the buffer going to the switching device;

a control device to operate the switching device between a first state connecting the first signal path to output and a second state connecting the second signal pathway to output;

so that the first state of the switching device passes audio to the output and the second state substitutes buffered audio samples for a data burst, to conceal the data burst from the output.

15. The apparatus of claim 14 further comprising a latch connected to the control device.

16. The apparatus of claim 14 further comprising a time delay device to delay operation of the switch for a pre-selected time.

17. The method of claim 14 wherein the buffered audio is taken from the signal near the data burst being concealed.

18. An apparatus to conceal data bursts in an analog audio waveform in an analog descrambler comprising:

a switching device having a first input to receive a descrambled waveform including audio with periodic data bursts and having a second input to receive said descrambled waveform delayed by an amount of time approximately equal to the length of a data burst from a storage buffer, and an output connectable to audio processing;

a control device which normally connects the first input to output but connects the second input to output when a data burst appears at the first input, so that delayed audio and not a data burst is sent to output during a data burst.

19. The method of claim 18 wherein the stored audio is taken from near said data burst.

* * * * *